(12) United States Patent
Demetrius et al.

(10) Patent No.: US 12,479,515 B2
(45) Date of Patent: Nov. 25, 2025

(54) CENTER FLOOR ATTACHMENT FOR A VEHICLE

(71) Applicant: Honda Motor Co., Ltd., Tokyo (JP)

(72) Inventors: Carlington George Demetrius, Dublin, OH (US); Yoshiaki Ikeda, Takanezawa-machi (JP); Yuze Li, Tochigi (JP); Hiroaki Taniguchi, Royal Oak, MI (US); Yuichiro Umeda, Novi, MI (US)

(73) Assignee: Honda Motor Co., LTD., Tokyo (JP)

( * ) Notice: Subject to any disclaimer, the term of this patent is extended or adjusted under 35 U.S.C. 154(b) by 273 days.

(21) Appl. No.: 18/067,953

(22) Filed: Dec. 19, 2022

(65) Prior Publication Data

US 2024/0199135 A1  Jun. 20, 2024

(51) Int. Cl.
  *B62D 25/20* (2006.01)
  *B62D 27/02* (2006.01)
  *B62D 27/06* (2006.01)

(52) U.S. Cl.
  CPC ............. *B62D 25/20* (2013.01); *B62D 27/02* (2013.01); *B62D 27/065* (2013.01)

(58) Field of Classification Search
  CPC .......... B60N 3/04; B60N 3/042; B60N 3/044; B60N 3/046; B60N 3/048; B62D 25/20; B62D 25/2054
  USPC ....................... 296/97.23, 191, 193.07, 184.1
  See application file for complete search history.

(56) References Cited

U.S. PATENT DOCUMENTS

| | | | |
|---|---|---|---|
| 1,953,991 A * | 4/1934 | Schjolin | B62D 31/02 296/178 |
| 2,191,526 A * | 2/1940 | Flogaus | B60H 1/00295 165/56 |
| 6,047,940 A | 4/2000 | Kaplan | |
| 6,451,444 B1 | 9/2002 | Ollila et al. | |
| 6,497,937 B1 | 12/2002 | Lam et al. | |
| 6,572,054 B1 * | 6/2003 | Smallhorn | H05K 7/20145 244/119 |
| 7,461,888 B2 * | 12/2008 | Brown | B62D 33/04 296/181.3 |
| 7,674,495 B2 | 3/2010 | Pardo et al. | |
| 10,259,199 B2 | 4/2019 | Beuchel et al. | |
| 10,480,120 B2 | 11/2019 | Guyot et al. | |
| 11,090,899 B2 | 8/2021 | Park et al. | |
| 11,608,119 B2 | 3/2023 | Kim | |
| 12,308,456 B2 | 5/2025 | Sabhapathi et al. | |
| 2002/0168503 A1 | 11/2002 | Dong et al. | |

(Continued)

FOREIGN PATENT DOCUMENTS

| | | |
|---|---|---|
| CN | 1840838 B | 4/2010 |
| CN | 203511664 U | 4/2014 |

(Continued)

OTHER PUBLICATIONS

FR2909351 Text (Year: 2008).*

(Continued)

*Primary Examiner* — Dennis H Pedder

(74) *Attorney, Agent, or Firm* — Plumsea Law Group, LLC

(57) ABSTRACT

A vehicle floor system includes a center floor garnish, and a plurality of brackets connected to a lower surface of the center floor garnish, wherein a portion of each of the brackets extends beyond an edge of the center floor and receives a mechanical fastener that fixes the center floor to a structure of a vehicle.

16 Claims, 5 Drawing Sheets

(56) References Cited

U.S. PATENT DOCUMENTS

| | | |
|---|---|---|
| 2006/0080941 A1 | 4/2006 | Ishii et al. |
| 2011/0006562 A1* | 1/2011 | Campbell .............. B60R 13/01 296/193.04 |
| 2012/0301727 A1 | 11/2012 | Kim et al. |
| 2016/0207283 A1 | 7/2016 | Wang et al. |
| 2018/0311931 A1 | 11/2018 | Wodzinski et al. |

FOREIGN PATENT DOCUMENTS

| | | | |
|---|---|---|---|
| CN | 205022586 U | 2/2016 | |
| CN | 103523115 B | 3/2016 | |
| CN | 207931818 U | 10/2018 | |
| CN | 208069836 U | 11/2018 | |
| CN | 208101817 U | 11/2018 | |
| CN | 208914720 U | 5/2019 | |
| CN | 209566987 U | 11/2019 | |
| CN | 210555173 U | 5/2020 | |
| CN | 210793367 U | 6/2020 | |
| CN | 113040585 A * | 6/2021 | ........... A47G 1/1606 |
| CN | 214930127 U | 11/2021 | |
| CN | 214985682 U | 12/2021 | |
| CN | 216401563 U | 4/2022 | |
| DE | 3417321 | 11/1985 | |
| DE | 202006009081 U1 | 8/2006 | |
| DE | 202008016032 U1 | 4/2010 | |
| DE | 102016101548 B4 | 7/2022 | |
| EP | 0522240 B1 | 11/1996 | |
| EP | 3006260 A1 | 4/2016 | |
| EP | 3210833 A1 | 8/2017 | |
| FR | 2909351 A1 * | 6/2008 | ........... B62D 25/025 |
| GB | 2200600 A | 8/1988 | |
| JP | 2006103403 A | 4/2006 | |
| JP | 3830684 B2 | 10/2006 | |
| JP | 4679206 B2 | 4/2011 | |
| JP | 5316604 B2 | 10/2013 | |
| JP | 2016074368 A | 5/2016 | |
| JP | 2016089483 A | 5/2016 | |
| JP | 2021095737 A | 6/2021 | |
| KR | 20100025723 A | 3/2010 | |

OTHER PUBLICATIONS

CN113040585 Text (Year: 2021).*
Non-Final Office mailed Mar. 3, 2025, U.S. Appl. No. 18/068,180, 14 pp.
First Office Action, Japanese Patent Application No. 2023-178754, 10 pp.
Notice of Allowance mailed Jun. 11, 2025, for U.S. Appl. No. 18/068,180; 18 pp.
Corrected Notice of Allowance mailed Jun. 24, 2025, for U.S. Appl. No. 18/068,180; 2 pp.
Second Office Action, Japanese Patent Application No. 2023-178754, Mar. 25, 2025, 7 pp.

* cited by examiner

CENTER FLOOR ATTACHMENT FOR A VEHICLE

BACKGROUND

The present disclosure relates to a center floor attachment and locating system for a floor garnish in a vehicle.

Generally, vehicles are trimmed in a mixture of fabrics, vinyl, leather, and wood. Floor materials are generally fabric mats or vinyl coverings, which are permanently installed using plastic rivets, weather stripping, and metal brackets, such as a frame of a car seat.

These floor materials are generally permanently fixed to an interior of the vehicle. For example, floor materials may be held in place by a mixture of weather stripping, clips, and vehicle seats. Removal and/or replacement of the floor materials can be complicated by the need to remove various additional components, such as the vehicle seats, which may be bolted in place.

There is a need in the art for a center floor attachment and locating system for a floor garnish in a vehicle, which may facilitate easy access to an underlying structure of the vehicle.

SUMMARY OF THE INVENTION

The present disclosure is directed to improvements in vehicle flooring. In one aspect, a set of brackets locate and fix a removeable floor garnish in a cabin of a vehicle.

In one or more aspects, a vehicle floor system comprises: a center floor panel; and a plurality of brackets connected to a lower surface of the center floor panel, wherein a portion of each of the brackets extends beyond an edge of the center floor and receives a mechanical fastener that fixes the center floor to a structure of a vehicle.

In one or more aspects, a vehicle floor system comprises: a center floor panel; a plurality of locator structures that locate the center floor panel on a structure of the vehicle; and a plurality of brackets connected to a lower surface of the center floor panel, wherein a portion of each of the brackets extends beyond an edge of the center floor and receives a mechanical fastener that fixes the center floor to a structure of a vehicle.

In some aspects, a vehicle floor system comprises: a center floor panel in a cabin of a vehicle; a plurality of perimeter floor garnishes around the center floor panel and in the cabin of the vehicle; and a plurality of brackets connected to a lower surface of the center floor panel, wherein a portion of each of the brackets extends beyond an edge of the center floor and receives a mechanical fastener that fixes the center floor to a structure of the vehicle, wherein the portion of the brackets extending beyond the edge of the center floor is covered by one or more of the perimeter floor garnishes.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

There is a need in the art for an improved vehicle flooring system. In one aspect, a plurality of brackets locate a removeable center floor on a structure of a vehicle. In at least some aspects, a battery may be located under the structure of the vehicle and the center floor panel is removeable to enable access to the battery. According to some aspects, additional perimeter floor garnishes are disposed flush with the center floor panel. The perimeter floor garnishes may be removeable.

Figure 1:
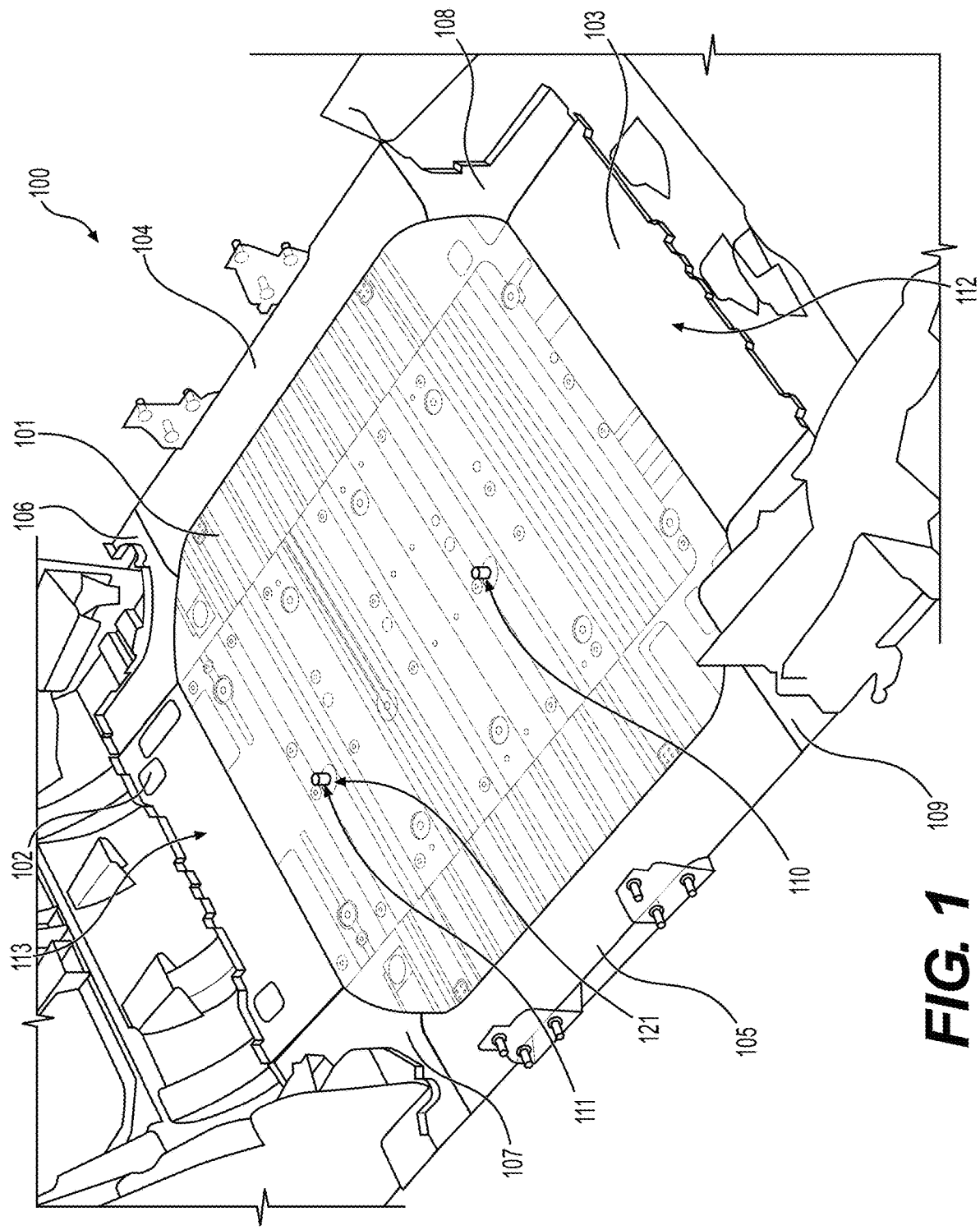
FIG. 1 illustrates an embodiment of a vehicle floor assembly according to some embodiments.

FIG. 1 illustrates an embodiment of a vehicle floor assembly 100 according to some embodiments. According to some embodiments, the vehicle floor assembly 100 includes a center floor panel 101. The center floor panel 101 may be a floor covering exposed to an interior of the vehicle, where a passenger may walk on the center floor panel 101 and/or place packages or bags on the center floor panel 101. An area covered by the center floor panel 101 may be a cabin area.

In some examples, the center floor panel 101 may be made of a wood material, a laminate material, or a composite material. The center floor panel 101 is a generally stiff and durable material selected for passenger accommodation. For example, the vehicle may be a public transportation vehicle or a ride-sharing vehicle having high levels of passenger accommodation.

A plurality of perimeter floor garnishes may complete a floor of the vehicle. The plurality of perimeter floor garnishes may include lateral garnishes. The lateral garnishes may include a rear area garnish 102, a front area garnish 103, a left garnish 104, and a right garnish 105. The rear area garnish 102 may be disposed below a rear passenger seat (not shown) in the cabin area of the vehicle. The front area garnish 103 may be disposed below a front passenger seat in the cabin area of the vehicle.

In some examples, the perimeter floor garnishes may be made of a plastic material. The perimeter floor garnishes are not limited to plastic materials, and other materials may be used. For example, the perimeter floor garnishes may be made of a some or a different material as the center floor panel 101.

In one example, the rear passenger seat and the front passenger seat may face one another, such that the center floor panel 101 extends between a front passenger seat area 112 and a rear passenger seat area 113, and the center floor panel 101 is the flooring of a passenger area of the vehicle.

In some aspects, at least one of the left garnish 104 and the right garnish 105 is disposed in an area adjacent to a door of the vehicle.

The plurality of perimeter floor garnishes may further include corner area garnishes. The corner area garnishes may include a rear-left garnish 106, a rear-right garnish 107, a front-left garnish 108, and a front-right garnish 109. The corner area garnishes may fill areas between the lateral garnishes.

According to some aspects, a top surface of the center floor panel 101 is flush with an upper surface of the rear area garnish 102 and an upper surface of the front area garnish 103. Flush joints in the vehicle floor assembly 100 may help a passenger to easily slide packages or bags under a seat. In some aspects, the center floor overlaps portions of perimeter floor garnishes, such that joints between the center floor and the perimeter floor garnishes have no gap exposing an underlying structure of the vehicle, for example, structure 201 in FIG. 2.

Figure 2:
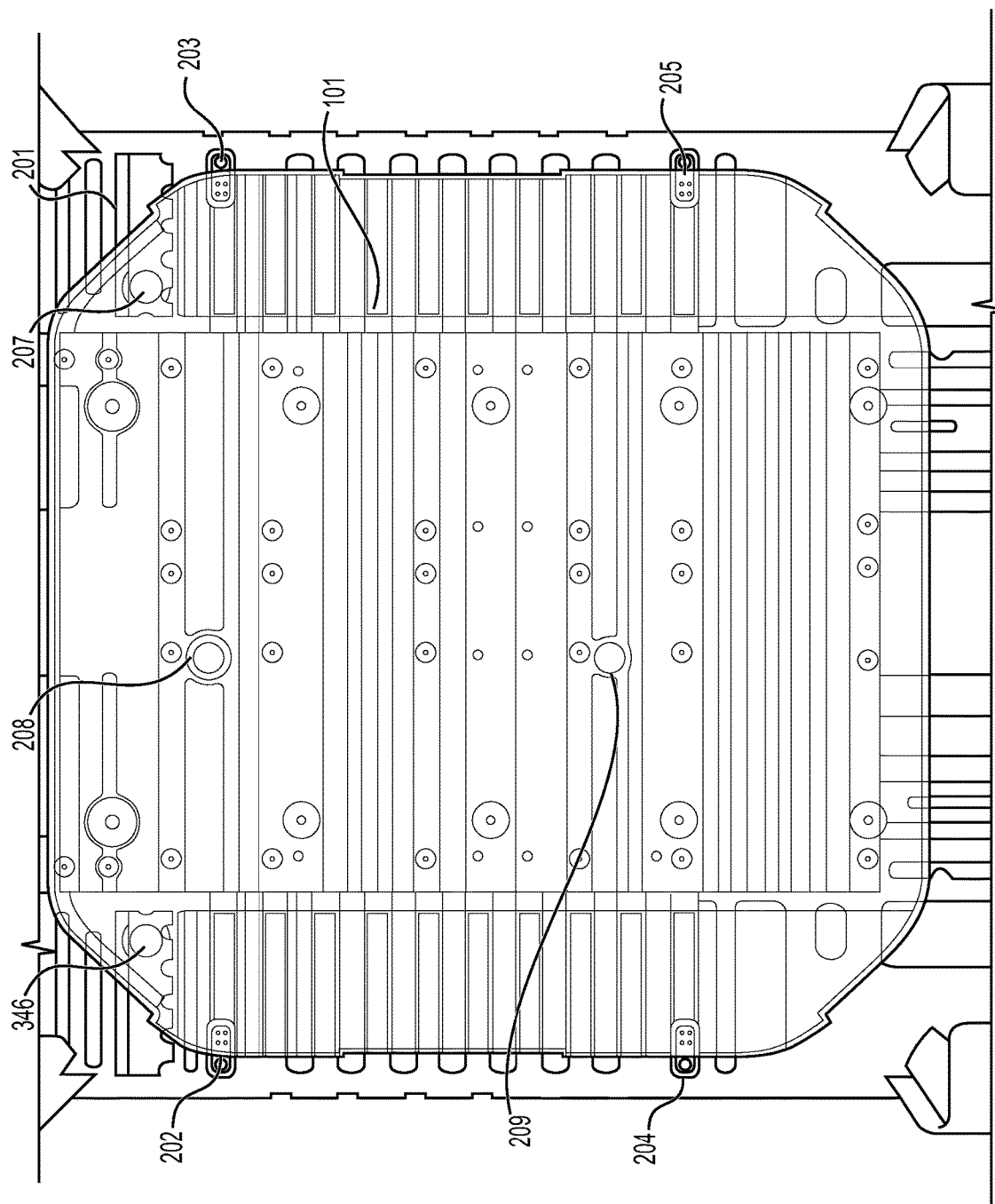
FIG. 2 illustrates an embodiment of a center floor system having brackets according to some embodiments.

FIG. 2 illustrates an embodiment of a center floor located on a structure of a vehicle by metal brackets according to some embodiments. The vehicle includes a structure 201, which may be a part of a monocoque of the vehicle, a floor pan of the vehicle, or an access panel of the vehicle. The structure 201 may be formed from a metal such as aluminum, steel, or magnesium. The structure 201 is not limited to these materials, and other materials may be used.

The center floor panel 101 may be connected to the structure by one or more brackets, In FIG. 2, the center floor panel 101 is located by a first bracket 202, a second bracket 203, a third bracket 204, and a fourth bracket 205. Each bracket is connected to an underside of the center floor panel 101 that faces the structure 201. Each bracket includes a means for fixing the center floor panel 101 to the structure 201 of the vehicle.

The center floor panel 101 and/or the structure 201 of the vehicle include one or more locator structures. The locator structures may ensure proper alignment of the center floor panel 101 and the brackets to the structure 201 of the vehicle. In one example, the locator structures include a first locator pin 206, a second locator pin 207, a third locator pin 208, and a fourth locator pin 209 align the center floor panel 101 and the brackets to the structure 201 of the vehicle. The locator pins may have various shapes. For example, the fourth locator pin 209 may be an oval shaped pin 110 (see FIG. 1) extending from the structure 201 of the vehicle to a corresponding slot in the center floor panel 101. In another example, the third locator pin 208 may be a round shaped pin 111 (see FIG. 1) extending from the structure 201 of the vehicle to a corresponding locator hole 121 in the center floor panel 101.

Figure 3:
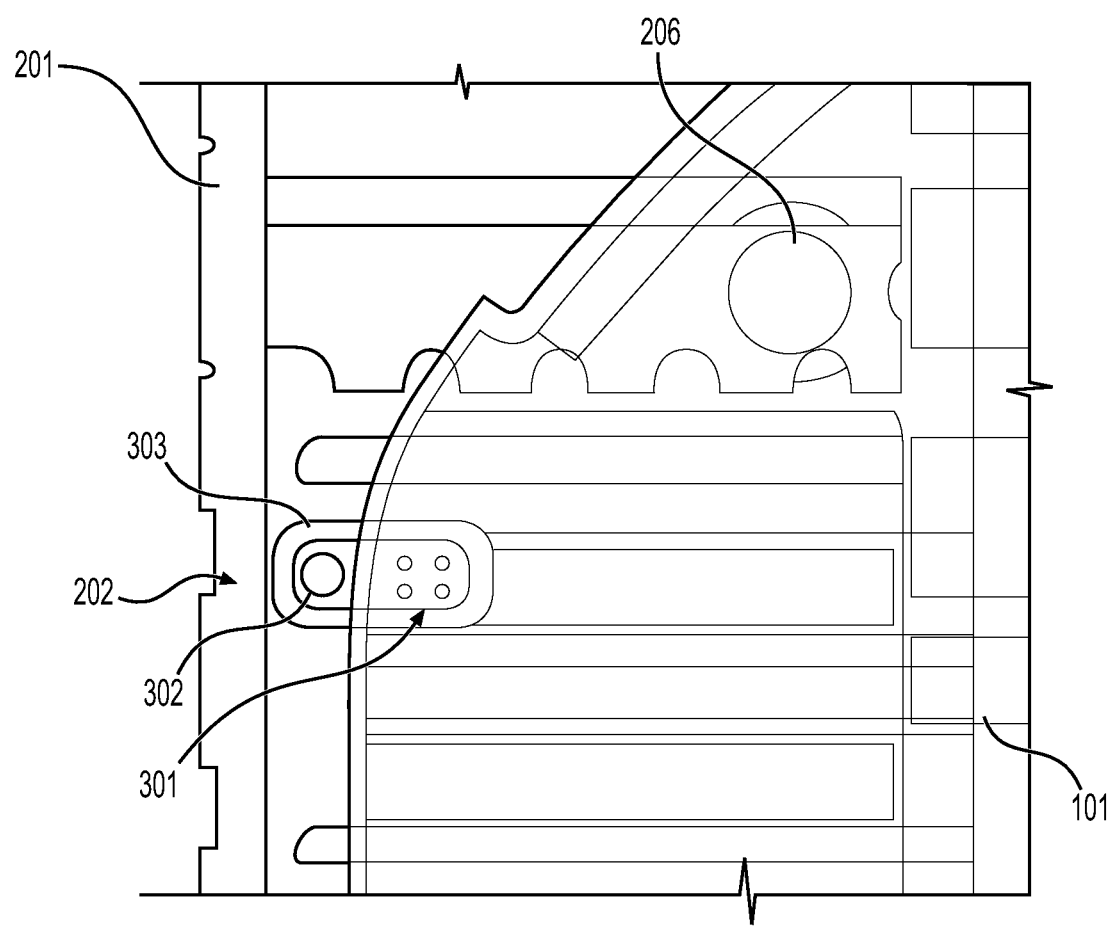
FIG. 3 illustrates an embodiment of a center floor system having a bracket and a locator structure and installed on a structure of the vehicle according to some embodiments.

FIG. 3 illustrates an embodiment of a center floor located by a bracket and a locator pin on a structure of the vehicle according to some embodiments. As illustrated the first locator pin 206 may ensure proper alignment of the center floor panel 101 and the first bracket 202 to the structure 201 of the vehicle. The first bracket 202 may be formed of a metal material. According to some aspects, the first bracket 202 is connected to the center floor panel 101. The connection of the first bracket 202 and the center floor panel 101 may by a fixing device 301. The fixing device 301 may include screws, bolts, rivets, adhesive, or a bonded structure. The first bracket 202 may be fixed to the structure 201 of the vehicle by a mechanical fastener 302. The mechanical fastener 302 may include a screw or bolt. The first bracket 202 may include a raised perimeter 303 that may directly support the center floor panel 101 and the right garnish 105 (not shown in FIG. 3).

According to some aspects, one or more of the perimeter garnishes abutted the center floor panel 101 and cover a portion of at least one of the brackets extending beyond an edge of the center floor panel 101. For example, the left garnish 104 and the right garnish 105 may be installed in the vehicle after the center floor panel 101 is fixed to the structure 201, such that the left garnish 104 and the right garnish 105 cover portions of the brackets that extending beyond an edge of the center floor panel 101 and that receive the mechanical fastener 302 to secure the center floor panel 101. According to at least one embodiment, the left garnish 104 and the right garnish 105 and directly supported by portions of the raised perimeters of the brackets extending beyond an edge of the center floor panel 101.

Figure 4:
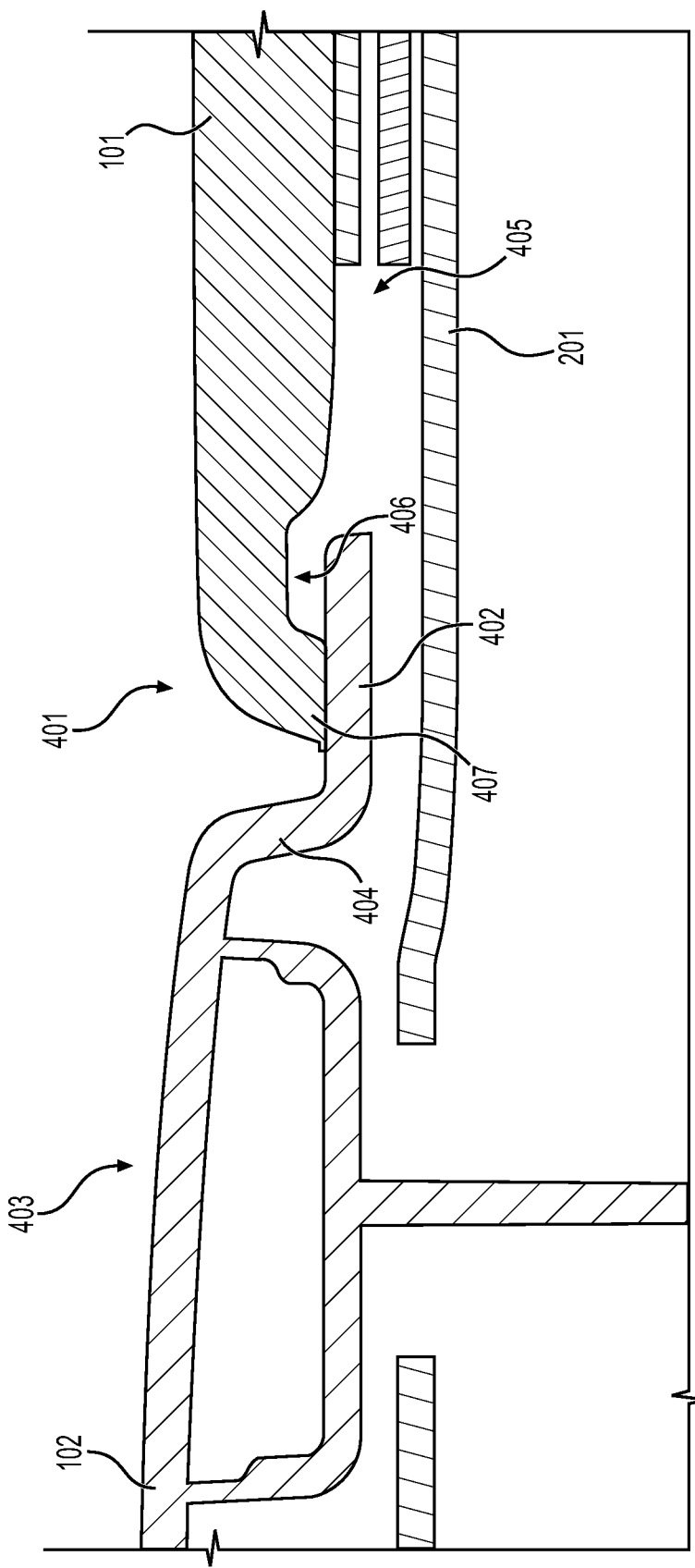
FIG. 4 illustrates an embodiment of a center floor panel and a perimeter floor garnish according to some embodiments.

FIG. 4 illustrates an embodiment of a center floor and a perimeter floor garnishes according to some embodiments. The center floor panel 101 and at least a portion of the rear area garnish 102 are disposed over the structure 201 of the vehicle. An upper peripheral edge 401 of the center floor panel 101 is disposed above a lower peripheral edge 402 of the rear area garnish 102. Accordingly, a half-lap joint is formed between the upper peripheral edge 401 of the center floor panel 101 and the lower peripheral edge 402 of the rear area garnish 102, such that there is no gap between the center floor panel 101 and the rear area garnish 102. The center floor panel 101 and the front area garnish 103 may be similarly arranged having a half-lap joint.

The rear area garnish 102 includes an upper, generally planar, surface 403, and an intermediate surface 404 extending downward from the upper surface to the lower peripheral edge 402 of the rear area garnish 102. The intermediate surface 404 may be substantially vertical in orientation. The front area garnish 103 may be similarly arranged, having an upper, generally planar, surface, and a joint surface extending downward to a peripheral edge of a perimeter garnish as illustrated in FIG. 4 and FIG. 5.

Figure 5:
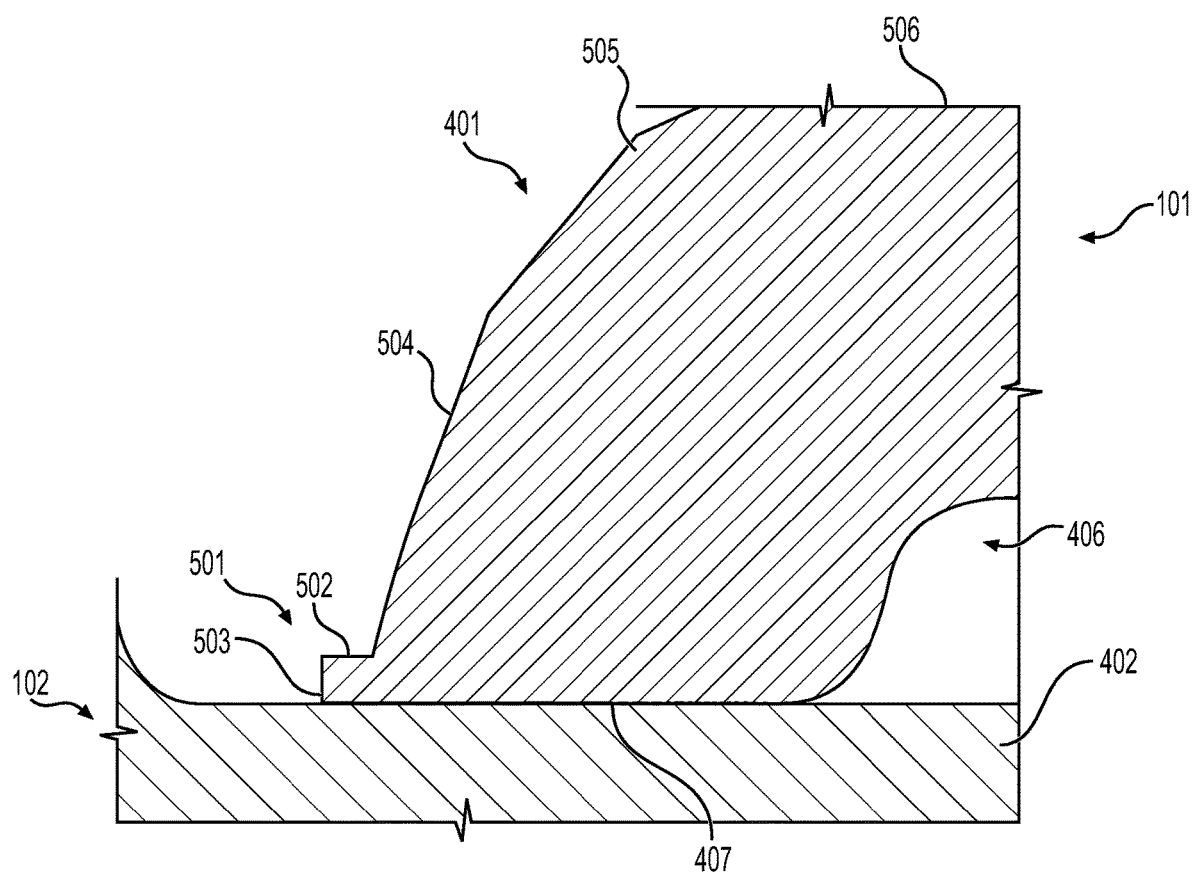
FIG. 5 illustrates an embodiment of a center floor panel and a perimeter floor garnish according to some embodiments.

Similarly, the rear-left garnish 106, the rear-right garnish 107, the front-left garnish 108, and the front-right garnish 109 may be similarly arranged, having an upper, generally planar, surface, and a joint surface extending downward to a peripheral edge of a perimeter garnish as illustrated in FIG. 4 and FIG. 5. That is, the upper peripheral edge 401 of the center floor panel 101 is disposed above a peripheral edge of each of the corner area garnishes.

According to some aspects, the center floor panel 101 further includes a horizontal lower surface 405 and an undercut portion 406 between the horizontal lower surface and the second peripheral edge. The undercut portion 406 may be a concave portion of the horizontal lower surface 405 of center floor panel 101 located between a main floor garnish and the upper peripheral edge 401 of the center floor panel 101. Further, the upper peripheral edge 401 of the center floor panel 101 may include an interface surface 407, that directed contacts the lower peripheral edge 402 of a floor garnish. The lower peripheral edge 402 of a floor garnish may extend into an area of the undercut portion 406, as illustrated in FIG. 4.

According to some aspects, the left garnish 104 and the right garnish 105 are installed after the center floor panel 101. The left garnish 104 and the right garnish 105 cover the brackets that secure the center floor panel 101. Since the left garnish 104, and the right garnish 105 are installed after the center floor panel 101, a joint between these garnishes may be a butt joint, a half-lap joint, or a tongue-and-grove joint, for example. FIG. 5 illustrates an embodiment of a center floor and perimeter floor garnishes according to some embodiments. The upper peripheral edge 401 of the center floor panel 101 is disposed above the lower peripheral edge 402 of the rear area garnish 102. The upper peripheral edge 401 of the center floor panel 101 may include a peripheral edge projection 501 having a horizontal top portion 502 and a vertical edge portion 503. The upper peripheral edge 401 of the center floor panel 101 may include an angled edge portion 504 extending from the horizontal top portion 502. A radius 505 may connect the angled edge portion 504 to a top surface 506 of the center floor panel 101.

According to some implementations, the horizontal top portion 502 of the peripheral edge projection 501 may be about 0.5 millimeters in length and the vertical edge portion 503 of the peripheral edge projection 501 may be about 0.5 millimeters in height. According to one example, the angled edge portion 504 has an angle of about 10-30 degrees, and more particularly 15 degrees, from the vertical. The radius 505 may be about 3-8 millimeters, and more particularly 5 millimeters.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

We claim:

1. A vehicle floor system comprising:
a center floor panel; and
a plurality of brackets connected to a lower surface of the center floor panel, wherein a portion of each of the brackets extends beyond an edge of the center floor panel and receives a mechanical fastener that fixes the center floor panel to a structure of a vehicle;
wherein each of the brackets further comprises a raised perimeter; and
wherein the lower surface of the center floor panel is directly supported by the raised perimeter of each of the brackets.

2. The vehicle floor system of claim 1, wherein a first set of the brackets are connected to a first edge of the center floor panel and a second set of the brackets are connected to a second edge of the center floor, wherein the first edge and the second edge are opposite edges of the center floor panel.

3. The vehicle floor system of claim 1, further comprising a perimeter floor garnish abutting the center floor panel and covering the raised perimeter of at least one of the brackets.

4. The vehicle floor system of claim 1, wherein the center floor panel includes a locator hole and the structure of the vehicle includes a locator pin fit into the locator hole.

5. The vehicle floor system of claim 1, wherein the structure of the vehicle includes a locator hole and the center floor panel includes a locator pin fit into the locator hole.

6. The vehicle floor system of claim 1, wherein the brackets are connected to the lower surface of the center floor panel by a fixing device.

7. The vehicle floor system of claim 6, wherein the fixing device includes at least one of a screw, a bolt, a rivet, an adhesive, and a bonded structure.

8. The vehicle floor system of claim 1, wherein the center floor panel is located on the structure of the vehicle by a locator pin.

9. The vehicle floor system of claim 8, wherein the locator pin is one of round shaped and oval shaped.

10. A vehicle floor system comprising:
a center floor panel;
a plurality of locator structures that locate the center floor panel on a structure of the vehicle; and
a plurality of brackets connected to a lower surface of the center floor panel, wherein a portion of each of the brackets extends beyond an edge of the center floor panel and receives a mechanical fastener that fixes the center floor panel to a structure of a vehicle;
wherein each of the brackets further comprises a raised perimeter, wherein the lower surface of the center floor panel is directly supported by the raised perimeter of each of the brackets.

11. The vehicle floor system of claim 10, wherein a first set of the brackets are connected to a first edge of the center floor panel and a second set of the brackets are connected to a second edge of the center floor panel, wherein the first edge and the second edge are opposite edges of the center floor panel.

12. The vehicle floor system of claim 10, further comprising a perimeter floor garnish abutting the center floor panel and covering the raised perimeter of at least one of the brackets.

13. The vehicle floor system of claim 10, wherein the brackets are connected to the lower surface of the center floor panel by a fixing device.

14. The vehicle floor system of claim 13, wherein the fixing device includes at least one of a screw, a bolt, a rivet, an adhesive, and a bonded structure.

15. A vehicle floor system comprising:
a center floor panel in a cabin of a vehicle;
a plurality of perimeter floor garnishes around the center floor panel and in the cabin of the vehicle; and
a plurality of brackets connected to a lower surface of the center floor panel, wherein a portion of each of the brackets extends beyond an edge of the center floor panel and receives a mechanical fastener that fixes the center floor panel to a structure of the vehicle, wherein the portion of the brackets extending beyond the edge of the center floor panel is covered by one or more of the perimeter floor garnishes;
wherein each of the brackets further comprises a raised perimeter, wherein the lower surface of the center floor panel is directly supported by the raised perimeter of each of the brackets.

16. The vehicle floor system of claim 15, wherein a first set of the brackets are connected to a first edge of the center floor panel and a second set of the brackets are connected to a second edge of the center floor panel, wherein the first edge and the second edge are opposite edges of the center floor panel.

* * * * *